United States Patent Office 2,989,525
Patented June 20, 1961

---

2,989,525
RECOVERY OF SAPOGENINS
Frederick James Wilkins, Ruislip, and Thomas Eric Holt, Bushey Heath, England, assignors to Glaxo Laboratories Limited, Greenford, England, a company of Great Britain
No Drawing. Filed Nov. 9, 1959, Ser. No. 851,553
Claims priority, application Great Britain Jan. 30, 1957
2 Claims. (Cl. 260—239.55)

This invention is concerned with the recovery of sapogenins from naturally occurring saponin-containing material.

Sapogenins are steroidal materials of economic importance in the manufacture of various steroids and are obtained by the hydrolysis of naturally-occurring glycosidic saponins which are present in the sap of many plants. In particular the sapogenin hecogenin which occurs for example in sisal is important as a starting material for the synthesis of cortisone, prednisone and related compounds having adreno-cortical and/or anti-inflammatory activity. The production of sapogenins, particularly hecogenin, in bulk and in a pure or substantially pure form is therefore of considerable importance.

The recovery of sapogenins from plant material is not free from difficulty. The naturally occurring saponin material must be submitted to a hydrolysis step which yields a complex mixture containing, besides the desired sapogenin, waxes, other steroidal matter and various coloured impurities.

One particular source of hecogenin which is of commercial importance is the sap obtained following decortication of the leaves of a plant of the sisal family such as *Agave sisalana* to yield the useful fibres. The sap obtained from parts of the plant other than the leaves is also important.

In the first step in one method (see, for example, Spensley, Chem. Ind., 1952, 426 and 1956, 229 and British Patent No. 728,961 to Spensely) for the recovery of hecogenin, the sap obtained by expression of a suitable plant material, such as sisal, is allowed to stand for about a week during which time autolysis occurs resulting in the formation of a slurry which settles and which can be separated, for example by decantation from the almost clear supernatant liquor. The supernatant liquor in general contains up to 80% by volume of the original sap whilst the desired hecogenin, still largely in the form of heconin, is contained in the residual slurry. The value of this step of autolysis is that a considerable removal of liquid from the hecogenin-containing fraction is achieved by a single operation. The residual slurry is a complex mixture still containing a substantial proportion of the hecogenin in a form combined with sugar residues, i.e. as heconin, although it is believed that during the autolysis some hydrolysis of the heconin occurs. It is therefore necessary to subject the slurry to a further hydrolysis, usually with mineral acid or alkali. The slurry however contains a considerable quantity of water and efforts to separate the solid material therefrom, for example by filtration or centrifugation, have met with little success, due possibly to the presence of stable colloidal material. This is unfortunate because the presence of a relatively large proportion of water in the slurry renders prohibitive the cost of shipping the slurry from the region of origin of the plant, to an industrialised region, and secondly, due to the quantity of water present, large quantities of acid or alkali are required to give the necessary acid or alkali concentration for hydrolysis.

As will be appreciated from the foregoing the hydrolysis of the slurry has to be carried out in the country of origin which is inconvenient because of the relatively high cost of acids and alkalis in such countries.

It is an object of the present invention to provide an improved process for the separation of hecogenin containing material from difficulty separable aqueous slurries containing such material.

It is a further object of the invention to provide an improved process, requiring neither acids nor alkalis, for the hydrolysis of hecogenin-containing material in which the hecogenin is present as a glycoside.

Further objects will become apparent as the description proceeds.

We have found that the slurry obtained on autolysis of plant juices containing hecogenin (largely as heconin) can be converted into a state in which it can not only be filtered or centrifuged, but in which the heconin is also hydrolysed to a substantial extent, by heating the slurry under pressure at a temperature of at least about 140° C. In this way a material is obtained from which solid material can be readily separated. This solid is in convenient form for shipping to an industrial region for further treatment. Consiredable hydrolysis of the glycoside linkages takes place during the heat treatment which simplifies and may even eliminate the need for subsequent hydrolysis, particularly if higher temperatures, e.g. of about 200° C., are used.

The use of temperature above 240° C. together thus leads to two valuable results, viz, separation and hydrolysis, both of which are obtained to a high degree. With temperatures below about 140° C. coagulation may not be satisfactory and hydrolysis of the heconin is negligible. By heating under pressure at temperatures of the order of 200° C. it is possible to obtain not only good separation of the hecogenin-containing material but also virtually complete hydrolysis without the aid of any acid or alkali. This use of temperatures above 140° C. hence enables one to operate in a most efficient manner and obviates the need for hydrolysis catalysts.

While both the time and temperature of the heating under pressure of the autolysed plant juice are very important factors in the present invention in that increasing either favours both ease of separation of and hydrolysis to the desired hecogenin, it is impossible to assign a critical range to either. Ease in separation is achieved earlier than a substantially complete hydrolysis of heconin to hecogenin. This permits the obtaining according to the invention of a product ranging all the way from one in which there has been only a partial hydrolysis and from which the solids are difficultly separable by filtration, but readily separable by centrifugation, to one in which there has been substantially complete hydrolysis of heconin to the desired hecogenin and from which solids may readily be separated by filtration.

The conditions employed will, in general, be dictated by economic considerations. It may be stated, however, that heating above about 250° C. may deleteriously affect the product, and it is generally convenient to operate at temperatures below about 200° C.; below approximately 140° C. no real advantage can be obtained by heating within any reasonable length of time. As exemplary of the effect of temperature and times of heating, it is pointed out that heating at 196° C. for 16 hours results in a product in which all of the heconin has been converted to hecogenin and the solid material may easily be separated by filtration. Heating at 196° C. for one hour leads to a product which may be readily filtered but which still contains a small amount of hecogenin in the form of the parent saponin. Treatment of the slurry at 157° C. for four hours gives a product which still contains a substantial amount of heconin, yet one in which the solids are in a readily filterable form. When the temperature of heat treatment under pressure is as low as 140° C., and the time of treatment is four hours, the resulting product can only be filtered very slowly and there remains really substantial amounts of non-hydrolysed material but the solids are readily separable by centrifugation. On the other hand, by heating at the higher temperatures, such as 190° C. to 200° C. for times as short as 15 minutes, there is obtained a product from which the solids can be readily separated although hydrolysis of the saponin may not be complete.

We have found that good results are obtained by operating at a temperature of 175–200° C. for 6 hours—15 minutes respectively, but suitable preliminary experiments will readily show the exact time and temperature required to obtain a material in any desired state.

The heat treatment may be carried out in an autoclave of any convenient material such as enamel lined cast iron or stainless steel.

The heat treatment under pressure is carried out at approximately the natural pH of the slurry, i.e. at about pH 4. If the heat treatment under pressure is carried out under alkaline conditions the slurry may become more difficult to filter. However, there is a slight improvement particularly at low temperature if the heat treatment under pressure is carried out in the presence of added mineral acid, e.g. by adding sulphuric acid to the slurry to a strength of N/10. Since if one were to add sulphuric acid to a strength of 3 N there would be no need to heat under pressure (i.e. at temperatures above 100° C.) it will be apparent that the amount of acid, if any, used will be governed by considerations of economy. In general terms, the heat treatment under pressure according to the invention, is conveniently carried out at a pH in the range 1 to 8. In spite of the improvement obtained by operating under acid conditions we prefer to carry out the heat treatment under pressure at about the natural pH of the slurry from the point of view of saving cost and absence of corrosion of the plant used. Moreover, there is the consideration that the heat treatment will probably be carried out in the region where the naturally occurring saponin-containing material is grown and in such a region mineral acids may not be readily accessible and/or may be expensive.

After the heat treatment the slurry may be filtered or centrifuged in any convenient manner. Before filtering or centrifuging however it may be convenient to allow the heat-treated slurry to settle for a time and then decant off the clear supernatant liquor. The slurry may, for example, be filtered, with or without pressure, through a filter-press or may be centrifuged, if necessary on a continuous basis.

The solid product thus obtained can then be dried by heating or by spreading out in the sun and then transported to another region for further purification and processing.

In order that the invention may be well understood the following examples are given by way of illustration only. In each of the examples the slurry was obtained by autolysis of the waste juice arising from the decortication of leaves of the plant Agave sisalana obtained from East African sources.

*Example 1*

Autolysed slurry (800 ml.) at its natural pH of approximately 4, was agitated and autoclaved at a temperature of 181° C. for four hours. The product obtained could be readily filtered and the filter cake was dried at 100° C. yielding a dark brown solid (16.6 gms.). This brown solid was further treated by boiling for six hours in 3 N hydrochloric acid (400 ml.). The reaction product was harvested by filtration, washed free of acid with water and dried at 100° C. yielding a brown solid (11.4 gms.). This solid, sodium hydroxide (2.0 g.) and methanol (300 ml.) were refluxed and stirred together for one hour. Calcium chloride (3.05 g.) was added, the mixture stirred for ten minutes and hot filtered. The filter cake was washed with hot methanol (100 ml.) and the combined filtrate and washings concentrated to 100 ml. On cooling, buff crystals of crude hecogenin separated and were harvested by filtration. A second crop was obtained on concentrating the mother liquor to one quarter volume. The combined first and second crops were slurried with petrol (25 ml. B.P. 100°–120° C.), filtered and washed with petrol (5 ml.). After drying at 100° C. overnight, crude hecogenin (1.67 g.) was obtained.

*Example 2*

Autolysed slurry (800 ml.) at its natural pH of approximately 4, was agitated and autoclaved at a temperature of 157° C. for four hours. The product obtained could be readily filtered and the filter cake was dried at 100° C. yielding a dark brown solid (16.0 gms.). This brown solid was further treated by boiling for six hours in 3 N hydrochloric acid (400 ml.). The reaction product was harvested by filtration, washed free of acid with water and dried at 100° C. yielding a brown solid (11.6 gms.) from which crude hecogenin (3.26 g.) was obtained as in Example 1.

*Example 3*

Autolysed slurry (130 ml.) at its natural pH of approximately 4, was sealed in a Carius tube and heated for sixteen hours at 195° C. The product was readily filterable and the filter cake obtained was dried at 100° C. yielding a dark brown solid (3.74 g.). Acid hydrolysis of the filtrate with 3 N sulphuric acid gave no additional precipitate indicating that there were no saponins remaining in the filtrate. The dry filter cake was extracted with methanol as in Example 1 yielding crude hecogenin (1.19 g.). The solid residue remaining after separation of the methanolic extract, was hydrolysed with 3 N sulfuric acid and again extracted with methanol yielding a further quantity of crude hecogenin (0.2 g.).

*Example 4*

Autolysed slurry (300 ml.) at its natural pH of approximately 4, was injected with live steam in an autoclave so as to maintain a temperature of 195–198° C. for 15 minutes. The product obtained was readily filtered and after drying at 100° C. the filter cake yielded a dark green solid (3.34 g.). This dark green solid was refluxed and stirred with benzene (400 ml.) for ½ hour, hot filtered and the benzene filtrate evaporated to dryness to yield crude hecogenin (1.16 g.). The benzene-insoluble solids were freed from residual benzene by drying at 100° C. and were refluxed with 3 N sulphuric acid for four hours. The mixture was filtered and the filter cake washed free from acid with water and dried at 100° C. The dry filter cake was refluxed and stirred with methanol (350 ml.) for ½ hour, hot filtered and the filtrate evaporated to dryness yielding a further quantity of crude hecogenin (0.46 g.).

In order to show the effect of temperature and time, a number of comparative experiments were carried out using various temperatures below and above 140° C. and for varying intervals of time. The results are set out in the following table:

| Conditions | | | Free sapogenins in sludge as percent of total | Notes [1] |
|---|---|---|---|---|
| Temp., °C. | Pressure, p.s.i.g. | Time, hrs. | | |
| 101 | | 16 | [2] | 30% saps. in filtrate; unsatisfactory filtration and centrifugation |
| 120 | 15 | 4 | [2] | 7% saps. in filtrate; unsatisfactory filtration and centrifugation |
| 123 | 22 | 4 | 28 | 11% saps. in filtrate |
| 138 | 35 | 4 | [2] | 4% saps. in filtrate; slow filtration and good centrifugation |
| 162 | 80 | 5 | 88 | Good filtration and centrifugation |
| 175 | 120 | 3 | 73.5 | Good filtration and good centrifugation |
| 175 | 120 | 6 | 88 | 1% saps. in filtrate |
| 185 | 150 | 2 | 92 | 0.2% saps. in filtrate |
| 196 | 200 | 1 | 95 | 0.2% saps. in filtrate |

[1] The term "saps." indicates "sapogenins in a water soluble combined state", i.e. as glycosides.
[2] Not determined.

Although the process of the invention has been particularly described and claimed with reference to hecogenin it will be apparent to those skilled in the art that it can be used for the recovery of other sapogenins where similar problems arise, e.g. in the recovery of botogenin from Mexican amaryllidaceae.

This application is a continuation-in-part of Serial No. 638,916 filed February 8, 1957, now abandoned, and entitled "Process for the extraction and purification of sapogenins."

We claim:

1. A process for separating solid hecogenin-containing material from a difficultly separable aqueous slurry obtained by the autolysis of heconin-containing plant sap, comprising autoclaving said slurry at approximately its natural pH and at a temperature of about 140° C.–250° C. for a time sufficient to effect hydrolysis of a substantial proportion of said heconin to hecogenin and form a mixture from which the resulting solid hecogenin-containing material is readily separable; and separating said solid from said mixture.

2. The process defined in claim 1 in which said heating is carried out at a temperature of from 195 to 200° C. for a time of from 6 hours to 15 minutes.

References Cited in the file of this patent
UNITED STATES PATENTS
2,827,456    Holt et al. _____ Mar. 18, 1958
FOREIGN PATENTS
728,961    Great Britain _____ Apr. 27, 1955